(12) United States Patent
Summers et al.

(10) Patent No.: US 11,429,753 B2
(45) Date of Patent: Aug. 30, 2022

(54) ENCRYPTION OF KEYBOARD DATA TO AVOID BEING READ BY ENDPOINT-HOSTED KEYLOGGER APPLICATIONS

(71) Applicant: Citrix Systems, Inc., Fort Lauderdale, FL (US)

(72) Inventors: Jacob Jared Summers, Coral Springs, FL (US); Joseph Nord, Lighthouse Point, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 209 days.

(21) Appl. No.: 16/144,317

(22) Filed: Sep. 27, 2018

(65) Prior Publication Data

US 2020/0104538 A1 Apr. 2, 2020

(51) Int. Cl.
*G06F 21/83* (2013.01)
*G06F 21/60* (2013.01)
(Continued)

(52) U.S. Cl.
CPC ............ *G06F 21/83* (2013.01); *G06F 21/602* (2013.01); *G06F 21/606* (2013.01);
(Continued)

(58) Field of Classification Search
CPC ... H04L 9/0825; H04L 63/0428; H04L 63/06; H04L 67/10
(Continued)

(56) References Cited

U.S. PATENT DOCUMENTS 6,836,548 B1 * 12/2004 Anderson ............... G06F 21/72
380/255
7,151,772 B1 * 12/2006 Kalmanek, Jr. ....... H04L 49/201
370/390
(Continued)

FOREIGN PATENT DOCUMENTS

CN 102681672 A 9/2012
CN 206339963 U * 7/2017
(Continued)

OTHER PUBLICATIONS

Dong. "Protecting sensitive web content from client-side vulnerabilities with CRYPTONS." In Proceedings of the 2013 ACM SIGSAC conference on Computer & communications security, pp. 1311-1324. 2013. (Year: 2013).*

(Continued)

*Primary Examiner* — Luu T Pham
*Assistant Examiner* — Walter J Malinowski
(74) *Attorney, Agent, or Firm* — BainwoodHuang

(57) ABSTRACT

Techniques for encrypting keyboard data prior to its being received by an operating system of an endpoint device, reducing the possibility of unencrypted keyboard data being logged by a keylogger application running on the endpoint device. The techniques employ an encryption filter communicably coupled between a keyboard and the endpoint device. The encryption filter receives unencrypted keyboard data from the keyboard, encrypts the keyboard data, and provides the encrypted keyboard data to the operating system of the endpoint device. The techniques can be employed in association with a back-end data processing center of a security standard compliant organization, which can receive the encrypted keyboard data from the endpoint device, and decrypt the keyboard data for use on a host system. In this (Continued)

US 11,429,753 B2
Page 2 way, access and/or storage of unencrypted keyboard data at the endpoint device can be avoided.

16 Claims, 4 Drawing Sheets

(51) Int. Cl.
*H04L 9/40* (2022.01)
*H04L 9/08* (2006.01)
*H04L 67/10* (2022.01)

(52) U.S. Cl.
CPC ........ *H04L 9/0825* (2013.01); *H04L 63/0428* (2013.01); *H04L 63/06* (2013.01); *H04L 67/10* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 8,250,151 | B2 * | 8/2012 | Zimman | G06F 21/34 709/206 |
| 8,281,114 | B2 | 10/2012 | Linetsky | |
| 8,347,398 | B1 * | 1/2013 | Weber | G06F 21/85 726/26 |
| 8,370,918 | B1 * | 2/2013 | Doukhvalov | H04L 63/02 726/12 |
| 8,693,691 | B2 | 4/2014 | Jacobs | |
| 8,924,515 | B1 * | 12/2014 | Bone | H04L 41/0806 709/219 |
| 8,970,450 | B2 | 3/2015 | Momchilov | |
| 9,251,334 | B1 * | 2/2016 | Molitor | G06F 21/10 |
| 9,740,507 | B2 * | 8/2017 | Pinto | G06F 9/452 |
| 10,021,088 | B2 | 7/2018 | Innes et al. | |
| 10,140,139 | B1 * | 11/2018 | Pratt | G06F 21/53 |
| 10,140,612 | B1 * | 11/2018 | Murray | H04L 9/002 |
| 2003/0210790 | A1 * | 11/2003 | Riedel | G06F 21/6218 380/277 |
| 2005/0044408 | A1 * | 2/2005 | Bajikar | G06F 21/85 726/4 |
| 2005/0050316 | A1 * | 3/2005 | Peles | H04L 63/166 713/151 |
| 2005/0091530 | A1 * | 4/2005 | Avraham | G06F 21/53 726/4 |
| 2005/0246778 | A1 * | 11/2005 | Usov | H04L 9/0822 726/28 |
| 2006/0036733 | A1 * | 2/2006 | Fujimoto | H04L 67/14 709/225 |
| 2006/0093150 | A1 * | 5/2006 | Reddy | H04L 9/0825 380/282 |
| 2006/0218190 | A1 * | 9/2006 | Frost | G06F 21/6227 |
| 2007/0021141 | A1 * | 1/2007 | Yokota | G06F 21/445 455/550.1 |
| 2007/0083604 | A1 * | 4/2007 | Zimman | G06F 21/32 709/207 |
| 2007/0182714 | A1 * | 8/2007 | Pemmaraju | G06F 21/602 345/168 |
| 2008/0137657 | A1 * | 6/2008 | Wood | H04L 45/302 370/392 |
| 2008/0179401 | A1 * | 7/2008 | Hart | G07F 7/0893 235/449 |
| 2009/0293132 | A1 * | 11/2009 | Henry | G06F 12/1408 726/27 |
| 2010/0115290 | A1 * | 5/2010 | Walch | G06F 21/83 713/190 |
| 2010/0195825 | A1 * | 8/2010 | Cini | G06F 21/83 380/52 |
| 2010/0211787 | A1 * | 8/2010 | Bukshpun | H04L 9/065 713/170 |
| 2011/0141124 | A1 * | 6/2011 | Halls | G06F 21/554 345/522 |
| 2011/0145916 | A1 * | 6/2011 | McKenzie | G06F 21/53 718/1 |
| 2011/0264922 | A1 * | 10/2011 | Beaumont | H04N 21/4181 713/189 |
| 2012/0005269 | A1 * | 1/2012 | Janssen | G06F 3/0481 709/203 |
| 2012/0079282 | A1 * | 3/2012 | Lowenstein | G06F 21/82 713/189 |
| 2012/0191983 | A1 * | 7/2012 | Simske | G06F 21/6209 713/189 |
| 2012/0326861 | A1 * | 12/2012 | Singh | G06Q 20/353 340/539.11 |
| 2013/0073849 | A1 * | 3/2013 | Wang | G06F 21/602 713/164 |
| 2013/0106698 | A1 * | 5/2013 | Zhang | G06F 3/04812 345/163 |
| 2013/0198524 | A1 * | 8/2013 | Balinsky | H04L 9/0866 713/189 |
| 2013/0301830 | A1 * | 11/2013 | Bar-El | H04L 63/0823 380/210 |
| 2014/0101782 | A1 * | 4/2014 | Beaumont | G06F 21/85 726/30 |
| 2014/0133656 | A1 * | 5/2014 | Wurster | H04L 9/3228 380/270 |
| 2014/0137265 | A1 * | 5/2014 | Dubman | G06F 21/6245 726/27 |
| 2014/0258736 | A1 * | 9/2014 | Merchan | G06F 21/62 713/193 |
| 2014/0320421 | A1 * | 10/2014 | Wei | G06F 3/0412 345/173 |
| 2014/0337558 | A1 * | 11/2014 | Powers | G06F 9/45558 710/313 |
| 2014/0372506 | A1 * | 12/2014 | Butner | H04L 67/04 709/203 |
| 2015/0012837 | A1 * | 1/2015 | Momchilov | G06F 3/0481 715/744 |
| 2015/0046696 | A1 * | 2/2015 | Zheng | H04W 12/04031 713/155 |
| 2015/0163205 | A1 * | 6/2015 | Taguchi | G06F 3/0673 713/171 |
| 2015/0213275 | A1 * | 7/2015 | Reese | G06F 21/84 726/26 |
| 2015/0324575 | A1 * | 11/2015 | Asnaashari | G06K 19/073 726/16 |
| 2015/0365237 | A1 | 12/2015 | Soffer | |
| 2016/0006803 | A1 * | 1/2016 | Kumar | H04L 67/1091 709/203 |
| 2016/0034702 | A1 * | 2/2016 | Sikka | G06F 9/45558 726/27 |
| 2016/0063219 | A1 * | 3/2016 | Vlot | H04L 63/0464 713/168 |
| 2016/0065543 | A1 * | 3/2016 | Muranaka | H04L 63/0428 713/168 |
| 2016/0085976 | A1 * | 3/2016 | Schiffman | G06F 21/74 726/30 |
| 2016/0088471 | A1 * | 3/2016 | Feng | G06F 3/04886 705/71 |
| 2016/0142485 | A1 * | 5/2016 | Mitkar | G06F 16/128 707/681 |
| 2016/0180080 | A1 * | 6/2016 | Heldt-Sheller | H04L 63/145 726/22 |
| 2016/0191604 | A1 * | 6/2016 | AbiEzzi | H04L 67/42 715/740 |
| 2016/0197909 | A1 * | 7/2016 | Innes | H04L 63/0807 726/6 |
| 2016/0234214 | A1 * | 8/2016 | Sethi | H04W 12/06 |
| 2016/0364559 | A1 * | 12/2016 | Bali | H04L 9/3231 |
| 2017/0012785 | A1 * | 1/2017 | Haga | G06F 21/44 |
| 2017/0012981 | A1 * | 1/2017 | Obaidi | H04L 63/102 |
| 2017/0024100 | A1 * | 1/2017 | Pieper | H04L 65/80 |
| 2017/0103217 | A1 * | 4/2017 | Arasu | H04L 9/0637 |
| 2017/0193026 | A1 * | 7/2017 | Pettovello | H04L 9/14 |
| 2017/0250859 | A1 * | 8/2017 | Gheorghe | H04L 67/1004 |
| 2017/0374130 | A1 * | 12/2017 | AbiEzzi | H04L 67/025 |
| 2018/0019980 | A1 * | 1/2018 | Dempster | H04L 63/0428 |

(56) References Cited

U.S. PATENT DOCUMENTS

| | | | |
|---|---|---|---|
| 2018/0026947 A1* | 1/2018 | Haworth | H04L 63/06 713/168 |
| 2018/0109947 A1* | 4/2018 | Kim | G06F 21/33 |
| 2018/0183596 A1* | 6/2018 | Deshpande | H04W 12/03 |
| 2019/0109877 A1* | 4/2019 | Samuel | H04L 9/0897 |
| 2019/0116179 A1* | 4/2019 | Xu | H04W 12/03 |
| 2019/0138204 A1* | 5/2019 | Halim | G06F 9/452 |
| 2019/0158569 A1* | 5/2019 | Singleton, IV | H04L 67/141 |
| 2019/0238519 A1* | 8/2019 | Bikumala | H04L 9/16 |
| 2019/0312867 A1* | 10/2019 | Nakamura | H04L 63/0884 |
| 2019/0327093 A1* | 10/2019 | Habraken | H04L 9/0897 |
| 2019/0363889 A1* | 11/2019 | Wang | H04L 9/0643 |
| 2020/0059454 A1* | 2/2020 | Yang | H04L 63/06 |
| 2020/0074114 A1* | 3/2020 | Cheng | G06F 21/44 |
| 2020/0344137 A1* | 10/2020 | Baljeu | H04L 41/5054 |
| 2022/0116901 A1* | 4/2022 | Nilsson | H04W 48/18 |

FOREIGN PATENT DOCUMENTS

| | | | |
|---|---|---|---|
| CN | 109040062 A | * 12/2018 | |
| CN | 109714185 A | * 5/2019 | H04L 41/0893 |
| GB | 2476242 A | * 6/2011 | G06F 21/85 |
| GB | 2561396 A | * 10/2018 | G06F 21/57 |
| KR | 20120105283 A | * 9/2012 | H04L 9/0618 |
| TW | 200928849 A | * 12/2007 | |
| WO | WO-0201462 A2 | * 1/2002 | G06Q 30/06 |

OTHER PUBLICATIONS

Mccune, Jonathan M. "Reducing the trusted computing base for applications on commodity systems." School of Electrical and Computer Engineering, Carnegie Mellon University (2009). (Year: 2009).*

Treat, Daniel G. "Keyboard encryption." IEEE Potentials 21, No. 3 (2002): 40-42. (Year: 2002).*

Maglio, Paul P., Rob Barrett, Christopher S. Campbell, and Ted Selker. "SUITOR: An attentive information system." In Proceedings of the 5th international conference on Intelligent user interfaces, pp. 169-176. 2000. (Year: 2000).*

Li, Chunxiao, Anand Raghunathan, and Niraj K. Jha. "A secure user interface for web applications running under an untrusted operating system." In 2010 10th IEEE International Conference on Computerand Information Technology, pp. 865-870. IEEE, 2010. (Year: 2010).*

Randell, Brian, and John Rushby. "Distributed secure systems: Then and now." In Twenty-Third Annual Computer Security Applications Conference (ACSAC 2007), pp. 177-199. IEEE, 2007. (Year: 2007).*

* cited by examiner

ENCRYPTION OF KEYBOARD DATA TO AVOID BEING READ BY ENDPOINT-HOSTED KEYLOGGER APPLICATIONS

BACKGROUND

Due to the advent of the Internet and the ubiquity of networked desktop and laptop computers, maintaining the security of confidential electronic information is a high priority in many organizations. For example, in the payment card industry (PCI), an information security standard known as the Payment Card Industry Data Security Standard (also referred to herein as the "PCI DSS standard") exists for increasing the security of confidential cardholder data, while reducing the likelihood of credit card fraud. In a typical PCI DSS compliant organization, such confidential cardholder data are submitted to and maintained in a back-end data processing center, which is separated from the organization's main computer network by a firewall and/or gateway. In many organizations, server-based computing is used to run application workloads in a hosted computer system. User computers perform remote execution of approved software applications and/or desktop environments hosted on servers and/or virtual machines (VMs) disposed in the back-end data processing center.

By maintaining confidential cardholder data within a back-end data processing center, and allowing access to the confidential cardholder data only through remote execution of approved software applications and/or desktop environments, the security of confidential cardholder data within a PCI DSS compliant organization is increased. Moreover, because maintenance of the confidential cardholder data is restricted to the area of the back-end data processing center, auditing of the organization's continued compliance with the PCI DSS standard can be performed more efficiently. Many other industries follow a similar model of providing remote access to sensitive data through hosted applications, such as the health care industry, which is required to follow Health Insurance Portability and Accountability Act (HIPAA) regulations, as well as the banking, insurance, and manufacturing industries, among others.

SUMMARY

With regard to the typical PCI DSS compliant organization, confidential cardholder data are submitted to the back-end data processing center by user computers (also referred to herein as "endpoint device(s)") that perform remote execution of approved software applications and/or desktop environments hosted within the back-end data processing center. To that end, a human operator enters the confidential cardholder data into an endpoint device (e.g., a desktop computer, a laptop computer) via a keyboard, and the endpoint device submits keyboard data corresponding to the confidential cardholder data across a firewall and/or gateway to the back-end data processing center, where hosted applications running on server computers process the entered data and communicate with a storage database. Such submission of confidential cardholder data by the endpoint device to the back-end data processing center as keyboard data can be problematic, however, in that the security of the confidential cardholder data cannot be completely assured at the time of its entry into the endpoint device. For example, a keystroke logger application (also referred to herein as a "keylogger application") may unknowingly be installed on the endpoint device, logging communications between the keyboard and the endpoint device and allowing logged confidential cardholder data to be accessed by malicious individuals.

Techniques are disclosed herein for encrypting keyboard data prior to its being received by an operating system of an endpoint device, reducing the possibility of unencrypted keyboard data being logged by a keylogger application running on the endpoint device. The disclosed techniques can employ an encryption filter communicably coupled between a keyboard and the endpoint device. The encryption filter can receive unencrypted keyboard data from the keyboard, encrypt the received keyboard data, and forward the encrypted keyboard data to the operating system of the endpoint device. The disclosed techniques can also be employed in association with a back-end data processing center of a security standard compliant organization, which can receive the encrypted keyboard data from the endpoint device, and decrypt the keyboard data for use on a host system. In this way, access and/or storage of unencrypted keyboard data at the endpoint device, such as by a keylogger application running on the endpoint device, can be avoided.

In certain embodiments, a method of encrypting keyboard data prior to its being received by an operating system of an untrusted device involves the untrusted device performing remote execution of a software application hosted by an external trusted server. The method includes, in response to the software application hosted by the external trusted server having focus, receiving, at an encryption filter, a first command to enter an encryption mode of operation from the untrusted device. The method further includes, having entered the encryption mode of operation, (i) receiving, at the encryption filter, unencrypted keyboard data from a keyboard of the untrusted device, (ii) encrypting, by an encryption application running on the encryption filter, the unencrypted keyboard data using one or more encryption/decryption keys associated with the encryption filter, and (iii) providing, by the encryption filter, the encrypted keyboard data to the operating system of the untrusted device. The method further includes sending, by the untrusted device, the encrypted keyboard data to the external trusted server for subsequent decryption.

In certain arrangements, the method further includes decrypting, by a decryption application running on the external trusted server, the encrypted keyboard data using the one or more encryption/decryption keys associated with the encryption filter.

In certain arrangements, the method further includes, in response to the software application hosted by the external trusted server losing focus, receiving, at the encryption filter, a second command to disengage the encryption mode of operation from the untrusted device.

In certain arrangements, the one or more encryption/decryption keys include a pre-shared key, and the method further includes pre-provisioning the pre-shared key on the encryption filter, and pre-provisioning the pre-shared key on the external trusted server. In certain further arrangements, a plurality of different pre-shared keys including the pre-shared key associated with the encryption filter are pre-provisioned on the external trusted server, and the method further includes (i) indexing the plurality of different pre-shared keys by a plurality of predetermined values respectively associated with multiple different encryption filters, (ii) having been sent, by the untrusted device, the encrypted keyboard data for subsequent decryption, querying, by the external trusted server, the untrusted device for the respective predetermined value associated with the encryption filter, (iii) receiving, at the encryption filter from the untrusted device, a second command to provide the respective predetermined value to the untrusted device, (iv) in response to the respective predetermined value being provided to the untrusted device, sending, by the untrusted device, the respective predetermined value indexing the pre-shared key to the external trusted server, (v) obtaining, by the external trusted server, the pre-shared key indexed by the respective predetermined value, and (vi) decrypting, by a decryption application running on the external trusted server, the encrypted keyboard data using the obtained pre-shared key.

In certain embodiments, a system for encrypting keyboard data prior to its being received by an operating system of an untrusted device includes an untrusted device having a keyboard, an encryption filter configured to run an encryption application, and an external trusted server configured to host a software application. The untrusted device is configured to perform remote execution of the software application hosted by the external trusted server. The encryption filter is configured (i) in response to the software application hosted by the external trusted server having focus, to receive a first command to enter an encryption mode of operation from the untrusted device, (ii) having entered the encryption mode of operation, to receive unencrypted keyboard data from the keyboard of the untrusted device, (iii) to encrypt, by the encryption application running on the encryption filter, the unencrypted keyboard data using one or more encryption/decryption keys associated with the encryption filter, and (iv) to provide the encrypted keyboard data to the operating system of the untrusted device. The untrusted device is further configured to send the encrypted keyboard data to the external trusted server for subsequent decryption.

In certain arrangements, the external trusted server is configured to run a decryption application, and to decrypt, by the decryption application running on the external trusted server, the encrypted keyboard data using the one or more encryption/decryption keys associated with the encryption filter.

In certain arrangements, the encryption filter is further configured, in response to the software application hosted by the external trusted server losing focus, to receive a second command to disengage the encryption mode of operation from the untrusted device.

In certain arrangements, the one or more encryption/decryption keys include one or more of (i) pre-shared keys, (ii) public/private cryptographic keys, and (iii) public/private key certificates.

In certain arrangements, the encryption filter is further configured as a separate device communicably coupled between the keyboard and the untrusted device. In certain further arrangements, the encryption filter is further configured as the separate device communicably coupled in a wireless fashion between the keyboard and the untrusted device.

In certain arrangements, the untrusted device includes a keyboard driver, and the keyboard driver is configured to perform functions of the encryption filter.

In certain arrangements, the external trusted server is one of a terminal server and a workstation virtual machine configured to provide a thin-client remote display presentation on the untrusted device.

In certain arrangements, the external trusted server is configured as a cloud-computing platform, and the software application hosted by the cloud-computing platform is a web application.

In certain arrangements, the keyboard of the untrusted device is configured to incorporate the encryption filter.

Other features, functions, and aspects of the claimed invention will be evident from the Detailed Description that follows.

BRIEF DESCRIPTION OF THE DRAWINGS

The foregoing and other objects, features, and advantages will be apparent from the following description of particular embodiments of the claimed invention, as illustrated in the accompanying drawings, in which like reference characters refer to the same parts throughout the different views.

FIG. 2b is a block diagram of the endpoint device of FIG. 2a;

FIG. 2c is a block diagram of the encryption filter of FIG. 2a; and

DETAILED DESCRIPTION

Techniques are disclosed herein for encrypting keyboard data prior to its being received by an operating system of an endpoint device, reducing the possibility of unencrypted keyboard data being logged by a keylogger application running on the endpoint device. The disclosed techniques can employ an encryption filter communicably coupled between a keyboard and the endpoint device. The encryption filter can receive unencrypted keyboard data from the keyboard, encrypt the received keyboard data, and forward the encrypted keyboard data to the operating system of the endpoint device. The disclosed techniques can also be employed in association with a back-end data processing center of a security standard compliant organization, which can receive the encrypted keyboard data from the endpoint device, and decrypt the keyboard data for use on a host system. In this way, access and/or storage of unencrypted keyboard data at the endpoint device can be avoided.

Figure 1:
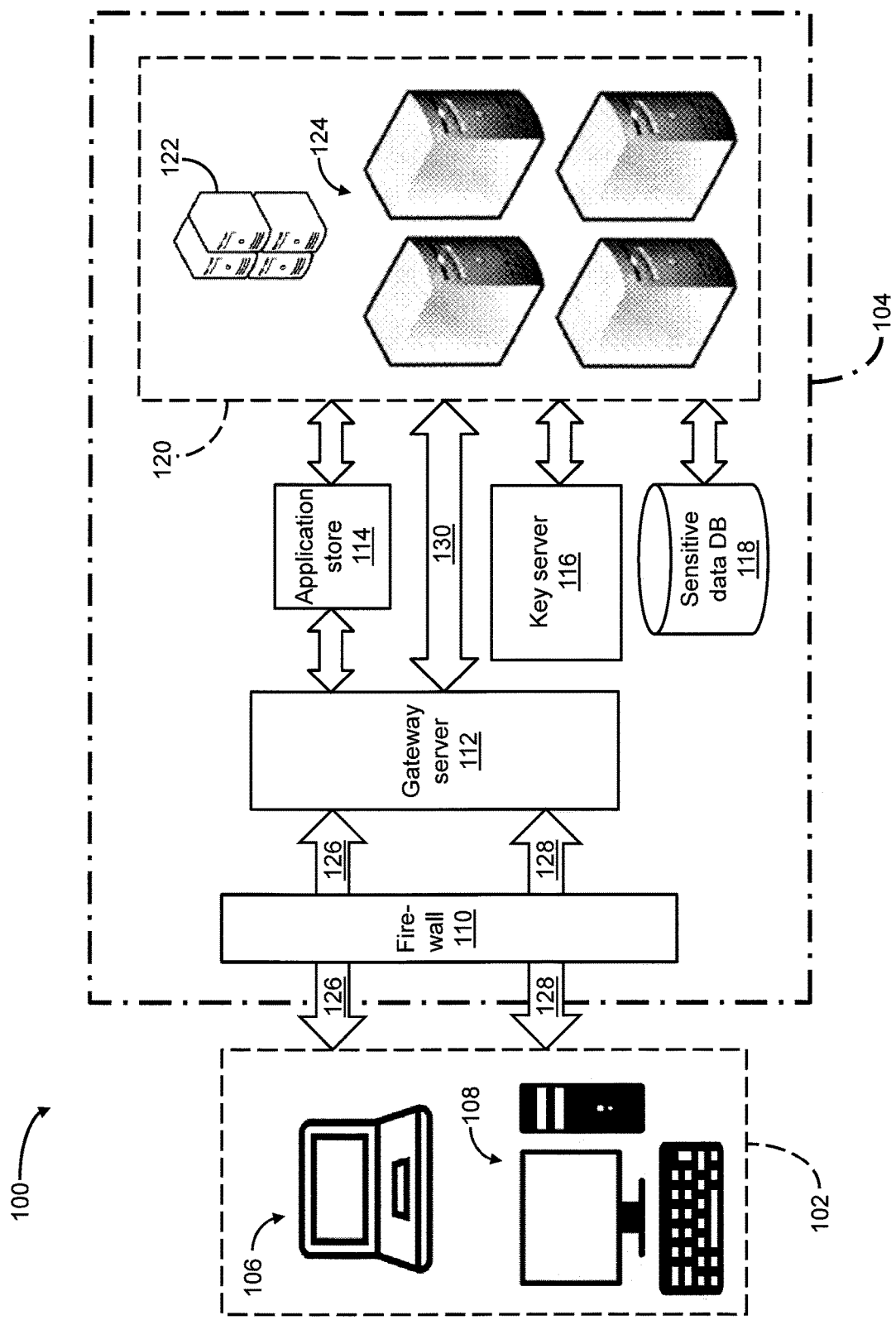
FIG. 1 is a block diagram an exemplary data processing environment, in which techniques may be practiced for encrypting keyboard data prior to its being received by an operating system of an endpoint device.

FIG. 1 depicts an illustrative embodiment of an exemplary data processing environment 100, in which techniques may be practiced for encrypting keyboard data prior to its being received by an operating system of an endpoint device. As shown in FIG. 1, the data processing environment 100 can include a plurality of user computers 102 (also referred to herein as "endpoint device(s)"), and a back-end data processing center 104 of a security standard compliant organization. For example, the security standard compliant organization may be compliant with the Payment Card Industry Data Security standard (the "PCI DSS standard") for providing increased security of confidential cardholder data, the Health Insurance Portability and Accountability Act (HIPAA) regulations, or any other suitable security standard and/or regulations. Further, the plurality of user computers 102 may include a laptop computer 106, a desktop computer 108, and/or any other suitable computer or computerized device that employs a keyboard for data input. The back-end data processing center 104 can include a firewall 110, a gateway server 112, an application store 114, a key server 116, and a sensitive data database 118 (the "sensitive data DB"), as well as a plurality of servers 120 for implementing a broker agent 122 and for providing one or more terminal servers and/or workstation virtual machines (VMs) 124.

In one embodiment, the terminal servers and/or workstation VMs 124 can be configured to provide thin-client remote display presentations on the laptop computer 106 and/or the desktop computer 108. For example, the terminal servers and/or workstation VMs 124 may be configured to run the XenApp® application virtualization software, the XenDesktop® desktop virtualization software, and/or any other suitable virtualization software. Further, the laptop computer 106 and/or the desktop computer 108 can be configured to receive data associated with virtual software applications/desktop environments generated on the terminal servers and/or workstation VMs 124. For example, the laptop computer 106 and/or the desktop computer 108 may be installed with the Citrix Receiver™ client component of the XenApp® and XenDesktop® application/desktop virtualization software, or any other suitable client-side component software. The XenApp® application virtualization software, the XenDesktop® desktop virtualization software, and the Citrix Receiver™ client component software are sold by Citrix Systems, Inc., Fort Lauderdale, Fla. USA.

In one mode of operation, the laptop computer 106 or the desktop computer 108 (i.e., the "endpoint device") executes the client-side component software to access, across the firewall 110 and gateway server 112, a login page of the application store 114. In one embodiment, endpoint communications across the firewall 110 and gateway server 112 to/from the application store 114 are encapsulated within a hypertext transfer protocol secure (HTTPS) encrypted channel 126. Further, the firewall 110 is configured such that the Transport Layer Security (TLS) port (e.g., port 443) and the ICA port (e.g., port 1494) are opened to the gateway server 112. It is noted that the gateway server 112 can be configured as an application firewall for controlling input, output, and/or access to/from the application store 114 by the endpoint device 106/108. For example, the gateway server 112 may be implemented as a NetScaler® gateway server, or any other suitable gateway server. The NetScaler® gateway server is sold by Citrix Systems, Inc., Fort Lauderdale, Fla. USA. Further, the application store 114 may be implemented as a Microsoft® Internet Information Services (IIS)™ web server, or any other suitable web server. The Microsoft® IIS™ web server is sold by Microsoft Corporation, Redmond, Wash. USA.

Having accessed the login page of the application store 114, a human operator of the endpoint device 106/108 authenticates him or herself to the application store 114 using the broker agent 122. For example, such user authentication may be a multi-factor authentication involving a key fob, a username, a password, a login credential(s), and/or a logon ticket(s), or any other suitable multi-factor authentication. Once the human operator has been authenticated, the application store 114 makes a query for published applications and/or desktops corresponding to this human operator. Having made the query, the application store 114 gathers information pertaining to software application and/or desktop environment names based on publishing information stored on a delivery controller, such as a NetScaler® App Delivery Controller™ sold by Citrix Systems, Inc., Fort Lauderdale, Fla. USA. In one embodiment, the gateway server 112 is configured to perform the functions of the delivery controller. The application store 114 forwards such information to the endpoint device 106/108 executing the client-side component software, thereby allowing program launch icons to be constructed on a display of the endpoint device 106/108. For example, if the endpoint device takes the form of the desktop computer 108, then such program launch icons may be constructed on a display 108b (see FIG. 2a) of the desktop computer 108.

To launch a desired remote application or desktop environment, the human operator of the endpoint device 106/108 taps, clicks, or otherwise selects a corresponding icon on the display of the endpoint device 106/108, causing a request for the remote application or desktop environment to be sent to the application store 114. Having received the request, the application store 114 contacts the delivery controller, requesting an assignment to the appropriate terminal server(s) and/or workstation VM(s) 124. In one embodiment, the application store 114 obtains an ICA® (Independent Computing Architecture) file for the desired remote application or desktop environment, and forwards the ICA file to the endpoint device 106/108. The ICA file contains the publishing information required by the endpoint device 106/108 to connect to the appropriate terminal server(s) and/or workstation VM(s) 124 for performing remote execution of the desired application or desktop environment. For example, the ICA file may contain a fully qualified domain name, a Secure Ticket Authority (STA) launch ticket, and/or any other suitable publishing information. Further, the endpoint device 106/108 may present the STA launch ticket to the gateway server 112 to obtain a connection to the terminal server(s) and/or workstation VM(s) 124, in accordance with the requested assignment. In one embodiment, the gateway server 112 is further configured to perform functions of an ICA proxy module, and endpoint communications across the firewall 110 and ICA proxy module for implementing a remote display protocol are encapsulated within a TLS channel 128. Having been presented with the STA launch ticket, the gateway server 112 provides the STA ticket to an STA server of the delivery controller, which validates the STA ticket and returns, to the gateway server 112, an Internet protocol (IP) address of the terminal server(s) and/or workstation VM(s) 124 containing the desired remote application or desktop environment. For purposes of maintaining confidentiality of data stored in the sensitive data DB 118, the endpoint device 106/108 is not provided with any knowledge of the internal network assignment of the terminal server(s) and/or workstation VM(s) 124 within the back-end data processing center 104.

Once the connection to the terminal server(s) and/or workstation VM(s) 124 is obtained, the gateway server 112 initiates an ICA session with the terminal server(s) and/or workstation VM(s) 124 over a channel 130, and the endpoint device 106/108 likewise engages in an ICA session with the gateway server 112 over the TLS channel 128. In effect, the gateway server 112 acts as an ICA proxy between the endpoint device 106/108 and the terminal server(s) and/or workstation VM(s) 124; i.e., the ICA proxy acts as the terminal server(s) and/or workstation VM(s) 124 to the endpoint device 106/108, and further acts as the endpoint device 106/108 to the terminal server(s) and/or workstation VM(s) 124. During the respective ICA sessions, the ICA proxy relays keyboard data, character data, graphics data, and so on, between the endpoint device 106/108 and the terminal server(s) and/or workstation VM(s) 124 over the respective channels 128, 130. It is noted that no direct network connection is provided between the endpoint device 106/108 and the terminal server(s) and/or workstation VM(s) 124 of the back-end data processing center 104.

Additional information relating to logging onto a remote computing environment can be found in U.S. Pat. No. 10,021,088 issued Jul. 10, 2018 entitled FAST SMART CARD LOGON, the disclosure of which is hereby incorporated herein by reference in its entirety.

As described herein, the gateway server 112 acting as an ICA proxy can relay keyboard data, character data, graphics data, and so on, between the endpoint device 106/108 and the terminal server(s) and/or workstation VM(s) 124 over the respective channels 128, 130. Because communications between the endpoint device 106/108 and the terminal server(s) and/or workstation VM(s) 124 via the ICA proxy are encapsulated within the TLS channel 128, the security of confidential cardholder data communicated between the endpoint device 106/108 and the back-end data processing center 104 is assured. However, the security of the confidential cardholder data cannot be completely assured at the time of its entry into the endpoint device 106/108. For example, a keystroke logger software application (also referred to herein as a "keylogger application(s)") may unknowingly be installed on the endpoint device 106/108, logging communications between a keyboard and the endpoint device 106/108 and allowing logged confidential cardholder data to be accessed by malicious individuals. Such keylogger applications are also known as keyboard-logging applications, keystroke-sniffing applications, and keyboard-sniffing applications, and form a subset of a group of software applications known as "spyware."

Techniques are disclosed herein for encrypting keyboard data prior to its being received by an operating system of the endpoint device 106/108, reducing the possibility of unencrypted keyboard data being logged by a keylogger application running on the endpoint device 106/108. In one embodiment, the disclosed techniques can employ an encryption filter (such as an encryption filter 202; see FIG. 2a) communicably coupled between a keyboard and the endpoint device 106/108. The encryption filter can receive unencrypted keyboard data from the keyboard, encrypt the received keyboard data, and forward the encrypted keyboard data to the operating system of the endpoint device 106/108. The disclosed techniques can also be employed in association with a back-end data processing center (such as the back-end data processing center 104; see FIG. 1), which can receive the encrypted keyboard data from the endpoint device 106/108, and decrypt the keyboard data for use on a host system, while avoiding access and/or storage of unencrypted keyboard data at the endpoint device 106/108.

Figure 2A:
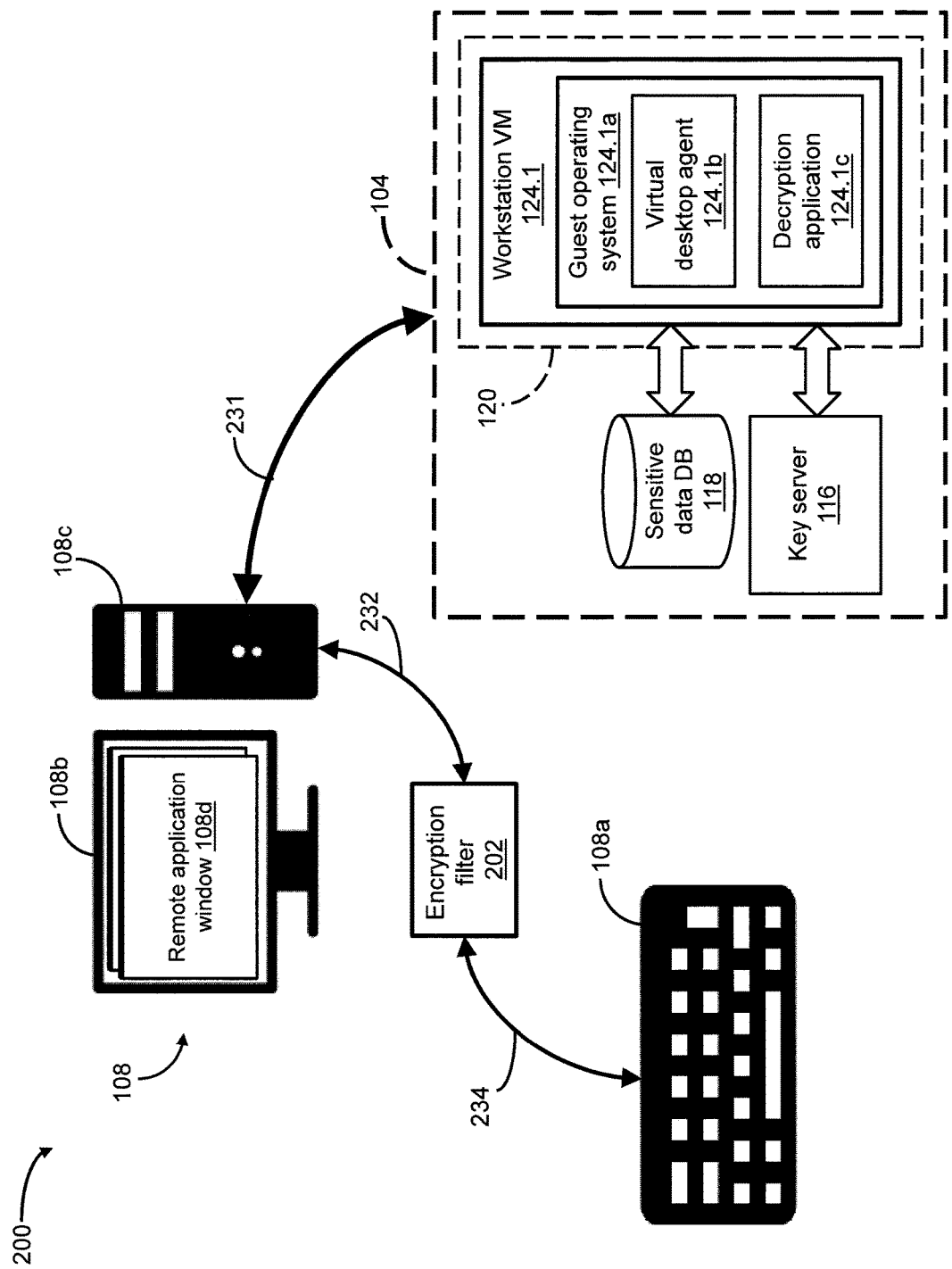
FIG. 2a is a diagram of an exemplary scenario for practicing the techniques of FIG. 1, involving an endpoint device, an encryption filter, and a back-end data processing center.

FIG. 2a depicts an exemplary scenario 200 for practicing the techniques disclosed herein that involves an endpoint device in the form of the desktop computer 108, the encryption filter 202, and the back-end data processing center 104. As shown in FIG. 2a, the desktop computer 108 can include a keyboard 108a, the display 108b, and a computer tower unit 108c, and the encryption filter 202 can be communicably coupled between the keyboard 108a and the computer tower unit 108c. As further shown in FIG. 2a, the back-end data processing center 104 includes the key server 116, the sensitive data DB 118, and the plurality of servers 120, which includes a workstation VM 124.1. In one embodiment, the workstation VM 124.1 includes a guest operating system 124.1a, as well as a virtual desktop agent 124.1b and a decryption application 124.1c running on the guest operating system 124.1a.

Figure 2C:
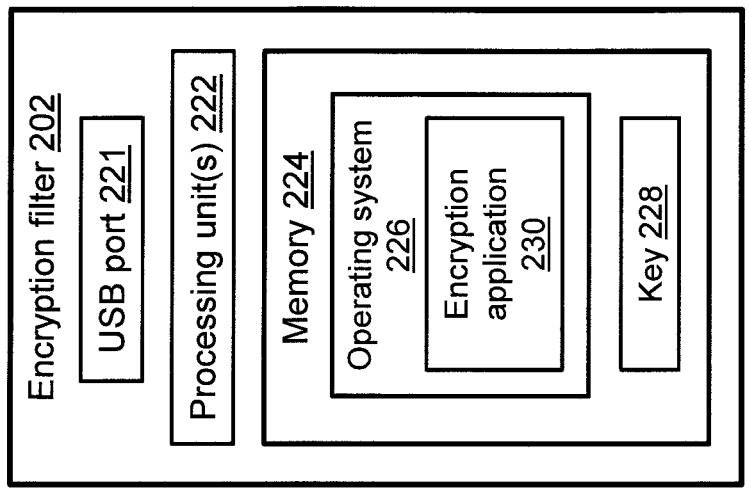
Figure 2B:
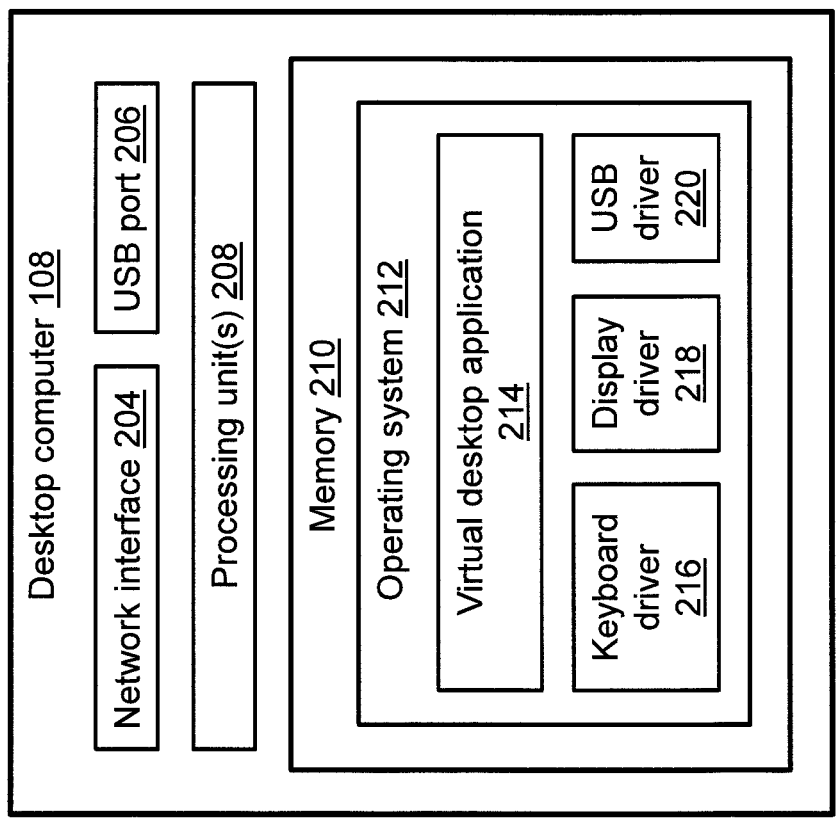

FIG. 2b depicts a detailed view of the desktop computer 108 of FIG. 2a. As shown in FIG. 2b, the desktop computer 108 can include a network interface 204, a Universal Serial Bus (USB) port 206, one or more processing units 208, and a memory 210. For example, each of the network interface 204, the USB port 206, the processing unit(s) 208, and the memory 210 may be incorporated into the computer tower unit 108c. The network interface 204 can be configured to connect the desktop computer 108 to a communications medium 231 (see FIG. 2a), which can include the HTTPS/TLS channels 126, 128, as well as one or more wired/wireless communications networks (e.g., local area network (LAN), wide area network (WAN), the Internet), communications paths, and/or communications links. The memory 210 can be configured to include volatile storage (e.g., dynamic random access memory (DRAM), static random access memory (SRAM)) and/or non-volatile storage (e.g., magnetic memory, flash memory). As shown in FIG. 2b, the memory 210 can also be configured to store a variety of software constructs, including an operating system 212, a virtual desktop application 214 running on the operating system 212, as well as a keyboard driver 216, a display driver 218, and a USB driver 220. The processing unit(s) 208 can be configured to operate in accordance with the various software constructs stored in the memory 210, and can be implemented in a variety of ways, using one or more processors running specialized software, one or more application specific integrated circuits (ASICs), one or more field programmable gate arrays (FPGAs), one or more discrete components, digital circuits, analog circuits, and so on, or any suitable combination thereof. In one embodiment, any suitable USB cable and/or connector 232 (see FIG. 2a) can be used to plug the encryption filter 202 into the USB port 206 incorporated into the computer tower unit 108c.

FIG. 2c depicts a detailed view of the encryption filter 202 of FIG. 2a. As shown in FIG. 2c, the encryption filter 202 can include a USB port 221, one or more processing units 222, and a memory 224. Like the memory 210 of the desktop computer 108, the memory 224 can be configured to include volatile storage (e.g., dynamic random access memory (DRAM), static random access memory (SRAM)) and/or non-volatile storage (e.g., magnetic memory, flash memory). As shown in FIG. 2c, the memory 224 can also be configured to store a variety of software constructs, including an operating system 226, an encryption application 230 running on the operating system 226, and a key 228 such as a pre-shared key. Further, the processing unit(s) 222 can be configured to operate in accordance with the various software constructs stored in the memory 224. Like the processing unit(s) 208 of the desktop computer 108, the processing unit(s) 222 of the encryption filter 202 can be implemented in a variety of ways, using one or more processors running specialized software, one or more application specific integrated circuits (ASICs), one or more field programmable gate arrays (FPGAs), one or more discrete components, digital circuits, analog circuits, and so on, or any suitable combination thereof. In one embodiment, any suitable USB cable and/or connector 234 (see FIG. 2a) can be used to plug the keyboard 108a into the USB port 221 of the encryption filter 202, which, in turn, can be plugged into the USB port 206 of the desktop computer 108 by the USB cable and/or connector 232.

The disclosed techniques for encrypting keyboard data prior to its being received by an operating system of an endpoint device will be further understood with reference to the following illustrative example, taking into account the scenario 200 depicted in FIG. 2a. In this example, it is assumed that a human operator of the desktop computer 108 has authenticated him or herself to the application store 114 (see FIG. 1) of the back-end data processing center 104, and has successfully launched a desired remote application of the workstation VM 124.1. For example, the remote application may be provided by the XenApp® application virtualization software, which may be executed by the virtual desktop agent 124.1*b* running on the guest operating system 124.1*a* of the workstation VM 124.1. Further, the virtual desktop application 214 (see FIG. 2*b*) running on the operating system 212 of the desktop computer 108 may correspond to the Citrix Receiver™ client component of the XenApp® application virtualization software hosted on the workstation VM 124.1.

Having launched the remote application of the workstation VM 124.1, the virtual desktop application 214 running on the desktop computer 108 causes, via the display driver 218, a user interface containing character data, graphics data, one or more input fields, and/or one or more command links, etc., associated with the operation of the remote application to appear within a remote application window 108*d* (see FIG. 2*a*) on the display 108*b*. For example, the back-end data processing center 104 may be part of a PCI DSS compliant organization, and the character/graphics data, input field(s), command link(s), etc., appearing within the remote application window 108*d* may enable the human operator of the desktop computer 108 to maintain or otherwise access confidential electronic information, such as confidential cardholder data, associated with the PCI DSS compliant organization.

In this example, once the remote application window 108*d* on the display 108*b* of the desktop computer 108 has or receives focus, the virtual desktop application 214 running on the desktop computer 108 sends, via the USB driver 220, a command over the USB cable and/or connector 232 to the encryption filter 202, directing the encryption application 230 (see FIG. 2*c*) running on the operating system 226 of the encryption filter 202 to enter or engage an encryption mode of operation. For example, as shown in FIG. 2*a*, the remote application window 108*d* having focus may be fully visible on the display 108*b*, while other window(s) that do not have focus (if any) may be only partially visible on the display 108*b*. In addition, the desktop computer 108 may visually indicate that the remote application window 108*d* has focus by displaying the title bar and/or border of the remote application window 108*d* in a color or shade that is more distinct than that of the title bar(s) and/or border(s) of the other window(s) that do not have focus (if any). It is noted that the command sent to the encryption filter 202 by the virtual desktop application 214 may be a USB command, or any other suitable command. It is further noted that, prior to receiving the USB command for entering or engaging the encryption mode of operation, the encryption filter 202 operates to allow keyboard data to pass, via the keyboard driver 216, unencrypted from the keyboard 108*a* over the USB cable and/or connector 234 to the operating system 212 of the desktop computer 108.

Having been directed to enter the encryption mode of operation, the encryption application 230 running on the encryption filter 202 engages the encryption mode, causing any unencrypted keyboard data subsequently received from the keyboard 108*a* to be encrypted prior to being forwarded, via the keyboard driver 216, to the operating system 212 of the desktop computer 108. Further, because the remote application window 108*d* on the display 108*b* has focus, the operating system 212 of the desktop computer 108 transfers the encrypted keyboard data received from the encryption filter 202 to the remote application running in that window 108*d*. For example, the encryption application 230 may employ a block encryption process, a cipher block-chaining process, a cipher block non-chaining process, or any other suitable encryption process, as well as pre-shared keys, public/private cryptographic keys, public/private key certificates, or any other suitable key(s) and/or certificate(s) for encrypting the keyboard data received from the keyboard 108*a*.

Once the remote application window 108*d* on the display 108*b* of the desktop computer 108 has focus and the encryption mode of the encryption filter 202 has been engaged, the human operator of the desktop computer 108 enters, via the keyboard 108*a*, confidential cardholder data, which is (i) encrypted by the encryption filter 202, (ii) forwarded, via the keyboard driver 216, to the operating system 212 of the desktop computer 108, and (iii) transferred to the remote application running in the remote application window 108*d*. Having been transferred to the remote application running in the remote application window 108*d*, the encrypted cardholder data are sent over the communications medium 231 to the back-end data processing center 104, where it is securely forwarded (e.g., via the TLS channel 128; see FIG. 1) to the remote application hosted on the workstation VM 124.1.

As described herein, the encryption application 230 running on the encryption filter 202 may employ a pre-shared key for encrypting the keyboard data received from the keyboard 108*a* of the desktop computer 108. For example, the pre-shared key may be pre-provisioned on the encryption filter 202 (e.g., as the key 228; see FIG. 2*c*), as well as in the back-end data processing center 104 (e.g., as a copy of the key 228 stored in the key server 116; see FIGS. 1 and 2*a*). In one embodiment, the key server 116 stores copies of a plurality of pre-shared keys indexed by a plurality of predetermined values respectively associated with multiple encryption filters, such as the encryption filter 202. For example, the plurality of predetermined values may be multi-bit (e.g., 128-bit) random numbers, predefined serial numbers associated with the respective encryption filters, or any other suitable predetermined values. If the predetermined values correspond to serial numbers of the respective encryption filters, then, once the encrypted cardholder data are received at the remote application hosted on the workstation VM 124.1, the remote application may query the virtual desktop application 214 running on the desktop computer 108 for the serial number of the encryption filter 202. For example, having been queried for the serial number of the encryption filter 202 by the remote application, the virtual desktop application 214 running on the desktop computer 108 may send, via the USB driver 220, another command (e.g., another USB command) over the USB cable and/or connector 232 to the encryption filter 202, directing the encryption application 230 to provide it with the serial number of the encryption filter 202.

Once the serial number of the encryption filter 202 has been provided to the virtual desktop application 214 running on the desktop computer 108, the desktop computer 108 sends the serial number over the communications medium 231 to the back-end data processing center 104 for forwarding to the remote application hosted on the workstation VM 124.1, which uses the serial number as an index into the key server 116 to obtain the stored copy of the pre-shared key associated with the encryption filter 202. Having obtained the stored copy of the pre-shared key, the remote application provides the copy of the pre-shared key to the decryption application 124.1*c* (see FIG. 2*a*) running on the guest operating system 124.1*a* of the workstation VM 124.1. The decryption application 124.1*c* employs the copy of the pre-shared key for decrypting the keyboard data originally received at the remote application in encrypted form, and provides the decrypted keyboard data for use on the host system. For example, prior to decryption, the keyboard data may include encrypted credit card numbers. Further, following decryption, the credit card numbers may be stored in the sensitive data DB 118.

Once the remote application window 108d on the display 108b of the desktop computer 108 loses focus, the virtual desktop application 214 running on the desktop computer 108 sends, via the USB driver 220, yet another command (e.g., yet another USB command) over the USB cable and/or connector 232 to the encryption filter 202, directing the encryption application 230 running on the encryption filter 202 to disengage the encryption mode and allow keyboard data entered by the human operator to pass, via the keyboard driver 216, unencrypted from the keyboard 108a over the USB cable and/or connectors 234, 232 to the operating system 212 of the desktop computer 108. It is noted, however, that at no time during this example was keyboard data, entered by the human operator via the keyboard 108a during remote execution of a software application hosted on the workstation VM 124.1, allowed to pass in unencrypted form to the operating system 212 of the desktop computer 108.

Figure 3:
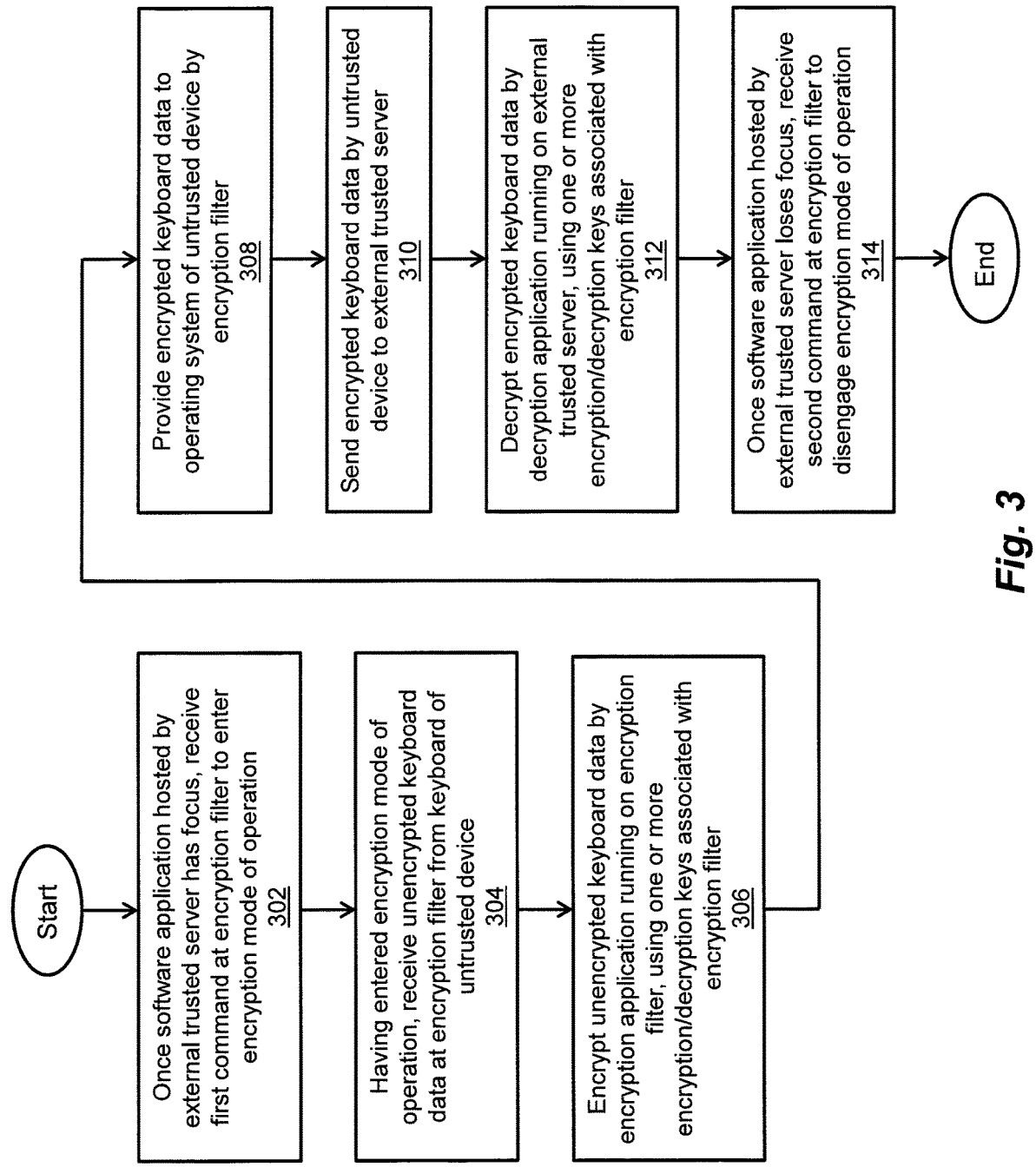
FIG. 3 is a flow diagram of an exemplary method of encrypting keyboard data prior to its being received by an operating system of an untrusted device performing remote execution of a software application hosted by an external trusted server.

An exemplary method of encrypting keyboard data prior to its being received by an operating system of an untrusted device performing remote execution of a software application hosted by an external trusted server is described below with reference to FIG. 3. As depicted in block 302, once the software application hosted by the external trusted server has focus, a first command is received at an encryption filter to enter an encryption mode of operation. As depicted in block 304, having entered the encryption mode of operation, unencrypted keyboard data are received at the encryption filter from a keyboard of the untrusted device. As depicted in block 306, the unencrypted keyboard data are encrypted by an encryption application running on the encryption filter, using one or more encryption/decryption keys associated with the encryption filter. As depicted in block 308, the encrypted keyboard data are provided to the operating system of the untrusted device by the encryption filter. As depicted in block 310, the encrypted keyboard data are sent by the untrusted device to the external trusted server. As depicted in block 312, the encrypted keyboard data are decrypted by a decryption application running on the external trusted server, using the one or more encryption/decryption keys associated with the encryption filter. As depicted in block 314, once the software application hosted by the external trusted server loses focus, a second command is received at the encryption filter to disengage the encryption mode of operation. In this way, access, storage, and/or logging of unencrypted keyboard data at the untrusted device, while the untrusted device is performing remote execution of the software application hosted by the external trusted server, can be avoided.

Having described the foregoing illustrative embodiments, other alternative embodiments and/or variations may be made and/or practiced. For example, it was described herein that the disclosed techniques may employ an encryption filter (such as the encryption filter 202; see FIG. 2a) communicably coupled between a keyboard and the endpoint device 106/108 to reduce the possibility of unencrypted confidential data being logged by a keylogger application running on the endpoint device 106/108. In an alternative embodiment, a keyboard driver (such as the keyboard driver 216; see FIG. 2b) included in the endpoint device 106/108 can be modified to perform the functions of the encryption filter. To that end, while the endpoint device 106/108 is performing remote execution of a software application hosted by an external trusted server, the modified keyboard driver can be configured to (i) receive unencrypted keyboard data from the keyboard, (ii) encrypt the received keyboard data, and (iii) forward the encrypted keyboard data to the operating system of the endpoint device 106/108, which can send the encrypted keyboard data for decryption on the external trusted server, using a pre-shared key shared with the modified keyboard driver.

It was further described herein that a pre-shared key could be pre-provisioned on an encryption filter (e.g., as the key 228; see FIG. 2c) and in a back-end data processing center (e.g., as a copy of the key 228 stored in the key server 116; see FIGS. 1 and 2a) for use in encrypting/decrypting keyboard data. By pre-provisioning a unique pre-shared key on each of multiple such encryption filters, a high assurance of the origin of the keyboard data can be achieved. In an alternative embodiment, a shared secret can be created at the start of a communication session between the encryption filter and the back-end data processing center, and used in place of the pre-shared key for encrypting/decrypting the keyboard data. In another alternative embodiment, a public key can be pre-provisioned on the encryption filter for encrypting the keyboard data, and a corresponding private key can be pre-provisioned in the back-end data processing center for decrypting the encrypted keyboard data. It is noted that the use of public key/private key cryptography would eliminate the need for a key server (e.g., the key server 116) to store pre-shared keys, but would require management of a public key/private key infrastructure. Based on the security architecture of an organization's environment, different techniques for encryption may be employed. In a further alternative embodiment, one or more certificates (e.g., Secure Sockets Layer and Transport Layer Security (SSL/TLS) certificates) can be loaded onto an encryption filter in addition to, or in place of, a pre-shared key or public key. It is further noted that an encryption filter employing public key/private key cryptography may deliver data to hosted applications with a higher level of privacy assurance using such certificates. Such an encryption filter may also verify commands for entering and/or disengaging an encryption mode as coming only from the hosted applications.

It was also described herein that, once a remote application window (e.g., the remote application window 108d; see FIG. 2a) on a display of the endpoint device 106/108 has focus, a virtual desktop application running on the endpoint device 106/108 could send a command to an encryption filter, directing the encryption filter to enter an encryption mode of operation. Further, once the remote application window loses focus on the display of the endpoint device 106/108, the virtual desktop application running on the endpoint device 106/108 could send another command to the encryption filter, directing the encryption filter to disengage the encryption mode. In an alternative embodiment, the encryption mode of the encryption filter can be disengaged by a predetermined combination of keystrokes (e.g., control-alt-delete, command-option-esc) on a keyboard of the endpoint device 106/108. Having disengaged the encryption mode of the encryption filter, the predetermined combination of keystrokes can be forwarded to the endpoint device 106/108, directing the endpoint device 106/108 not to give focus to the remote application window. In another alternative embodiment, a remote application hosted on a terminal server and/or VM can be configured to encrypt commands for engaging/disengaging the encryption mode of the encryption filter, using, for example, a pre-shared key shared with the encryption filter. Once the encrypted command(s)

are received at the endpoint device 106/108 and sent to the encryption filter, an encryption application running on the encryption filter can decrypt the command(s) using the pre-shared key, and engage/disengage the encryption mode, as directed by the respective command(s).

It was further described herein that the disclosed techniques could be employed with terminal servers and/or workstation VMs configured to provide thin-client remote display presentations on the endpoint device 106/108. In an alternative embodiment, the disclosed techniques can be employed with cloud-computing platforms configured to host web applications. For example, a web browser running on the endpoint device 106/108 may function as a user interface for a web application, while processing for the web application occurs mainly on a cloud-computing platform. Further, once a web browser window for the web application has focus on the endpoint device 106/108, the web application may send a command to an encryption filter, directing the encryption filter to enter an encryption mode of operation. Having entered the encryption mode of operation, the encryption filter may receive unencrypted keyboard data from a keyboard, encrypt the received keyboard data, and forward the encrypted keyboard data to the operating system of the endpoint device 106/108, which may then send the encrypted keyboard data to the web application processing on the cloud-computing platform for decryption. Once the web browser window for the web application loses focus on the endpoint device 106/108, the web application may send another command to the encryption filter, directing the encryption filter to disengage the encryption mode of operation.

It was also described herein that the functions of an encryption filter could be implemented in an external device (e.g., the encryption filter 202; see FIG. 2*a*) communicably coupled between a keyboard and the endpoint device 106/108, or in a keyboard driver on the endpoint device 106/108. In an alternative embodiment, the encryption filter can be implemented within a desktop keyboard (e.g., the keyboard 108*a* of the desktop computer 108; see FIG. 2*a*), or a laptop keyboard (e.g., a keyboard of the laptop computer 106; see FIG. 1). In another alternative embodiment, one or more indicators (e.g., LEDs) can be provided on the encryption filter 202 to visually indicate whether an encryption mode of operation is engaged or disengaged. In still another alternative embodiment, the encryption filter 202 can incorporate a predetermined delay from the time when the encryption mode of operation is engaged, to the time when the encryption mode of operation is disengaged, allowing a human operator sufficient time to take corrective action in the event the encryption mode of the encryption filter 202 was disengaged by mistake. In yet another alternative embodiment, the encryption filter 202 can be communicably coupled in a wireless fashion (e.g., via Bluetooth wireless communications) between the keyboard and the endpoint device 106/108. In this alternative embodiment, the keyboard 108*a* can be wirelessly paired with the encryption filter 202, which, in turn, can be wirelessly paired with the desktop computer 108.

It was further described herein that any suitable USB cable and/or connector could be used to plug a keyboard into a USB port of an encryption filter, which, in turn, could be plugged into a USB port of a computer by a USB cable and/or connector. In an alternative embodiment, a PS/2 connector configuration, or any other suitable connector configuration, can be employed to connect a keyboard to the encryption filter. In another alternative embodiment, an encryption filter can include both a USB port and a PS/2 port for providing a suitable connection to a keyboard, as well as a USB cable/connector for providing a connection to an endpoint device. Other cable/connector configurations are also possible.

Although features have been shown and described herein with reference to particular illustrative embodiments thereof, such features may be included and are hereby included in any of the disclosed embodiments and their variants. Thus, it is understood that features disclosed in connection with any embodiment are included as variants of any other embodiment. Further, the improvement or portions thereof may be embodied as a computer program product including one or more non-transient, computer-readable storage media, such as a magnetic disk, magnetic tape, compact disk (CD), digital versatile disk (DVD), optical disk, flash drive, solid state drive (SSD), secure digital (SD) chip or device, application specific integrated circuit (ASIC), field programmable gate array (FPGA), and/or the like. Any number of computer-readable media may be used. The media may be encoded with instructions that, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, acts, elements, or aspects of something in an open-ended fashion. Also, as used herein and unless a specific statement is made to the contrary, the word "set" or "subset" means one or more of something. This is the case regardless of whether the phrase "set of" or "subset of" is followed by a singular or plural object, or whether it is conjugated with a singular or plural verb. Further, although ordinal expressions, such as "first," "second," "third," and so on, may be used as adjectives herein, such ordinal expressions are used for identification purposes, and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. Although certain embodiments are disclosed herein, it is understood that these are provided by way of example only, and that the disclosed systems, apparatus, and methods are not limited to these particular embodiments.

While various embodiments of the disclosed systems, apparatus, and methods have been particularly shown and described, it will be understood by those skilled in the art that various changes in form and/or details may be made therein, without departing from the scope of the invention as defined by the appended claims.

What is claimed is:

1. A method comprising:
   in response to an application window of an untrusted computing device having focus, receiving, at an encryption device, a first command from a remote application hosted by a remote virtual machine (VM), the untrusted computing device being in communication with a keyboard;
   in response to receipt of the first command, entering, by the encryption device, an encryption mode of operation;

encrypting data from the keyboard by the encryption device, the encrypted data being provided to the remote application via an application of the untrusted computing device, a first pre-shared key being pre-provisioned in association with the encryption device, a plurality of indexed pre-shared keys including the first pre-shared key being pre-provisioned in association with the remote VM;

in response to receipt of a second command from the remote application, accessing, by the encryption device, a value that identifies the encryption device, the value being provided to the remote application via the application of the untrusted computing device, the encrypted data being decrypted at the remote VM using the first pre-shared key indexed by the value;

pre-provisioning the first pre-shared key in association with the encryption device, the plurality of indexed pre-shared keys being indexed by a plurality of values, respectively, the plurality of values including the value that identifies the encryption device; and in response to receipt at the application of the untrusted computing device of a query for the value from among the plurality of values, receiving, at the encryption device, the second command to provide the value.

2. The method of claim 1 further comprising:
in response to the application window of the untrusted computing device losing focus, receiving, at the encryption device, a third command from the remote application; and
in response to receipt of the third command from the remote application, disengaging, by the encryption device, the encryption mode of operation.

3. The method of claim 1 further comprising:
in response to receipt of the second command, sending, by the encryption device, the value indexing the first pre-shared key for receipt at the remote application, the encrypted data being decrypted, using the first pre-shared key, by the remote VM running a decryption application.

4. The method of claim 1 wherein the first command is configured as an encrypted command, and wherein the method further comprises:
decrypting, by the encryption device, the encrypted command,
wherein the entering of the encryption mode of operation includes entering the encryption mode of operation in response to the decrypting of the encrypted command.

5. The method of claim 4
wherein the encrypted command is encrypted by the remote application using the first pre-shared key.

6. The method of claim 1 further comprising:
receiving, at the encryption device, predetermined data from the keyboard; and
in response to receipt of the predetermined data from the keyboard, disengaging, by the encryption device, the encryption mode of operation.

7. The method of claim 6 wherein the predetermined data from the keyboard in communication with the untrusted computing device causes the application window of the untrusted computing device to lose focus.

8. The method of claim 6 further comprising:
delaying, by the encryption device, disengagement of the encryption mode of operation by a predetermined delay time.

9. The method of claim 1 further comprising:
wirelessly pairing the encryption device with the untrusted computing device, the keyboard being wirelessly paired with the encryption device.

10. A system comprising:
a memory; and
processing circuitry configured to execute program instructions out of the memory:
in response to an application window of an untrusted computing device having focus, to receive a first command from a remote application hosted by a remote virtual machine (VM), the untrusted computing device being in communication with a keyboard;
in response to receipt of the first command, to enter an encryption mode of operation;
to encrypt data from the keyboard, the encrypted data being provided to the remote application via an application of the untrusted computing device, a first pre-shared key being pre-provisioned in association with an encryption device, a plurality of indexed pre-shared keys including the first pre-shared key being pre-provisioned in association with the remote VM;
in response to receipt of a second command from the remote application, to access a value that identifies the encryption device, the value being provided to the remote application via the application of the untrusted computing device, the encrypted data being decrypted at the remote VM using the first pre-shared key indexed by the value;
to pre-provision the first pre-shared key in association with the encryption device, the plurality of indexed pre-shared keys being indexed by a plurality of values, respectively, the plurality of values including the value that identifies the encryption device; and
in response to receipt at the application of the untrusted computing device of a query for the value from among the plurality of values, to receive the second command to provide the value.

11. The system of claim 10 wherein the processing circuitry is further configured, in response to the application window losing focus, to execute the program instructions out of the memory to receive a third command from the remote application; and
in response to receipt of the third command from the remote application, to disengage the encryption mode of operation.

12. The system of claim 10 wherein encryption of the data is done with use of one or more encryption/decryption keys including one or more of (i) pre-shared keys, (ii) public/private cryptographic keys, and (iii) public/private key certificates.

13. The system of claim 10 wherein the processing circuitry is further configured to be wired or wirelessly coupled to the keyboard.

14. The system of claim 10 wherein the remote VM is configured as part of a cloud-computing platform, and wherein the remote application hosted by the remote VM is a web application.

15. A computer program product including non-transitory, computer-readable media having instructions that, when executed by control circuitry of a computerized apparatus, cause the control circuitry to perform a method comprising:
in response to an application window of an untrusted computing device having focus, receiving, at an encryption device, a first command from a remote application hosted by a remote virtual machine (VM), the untrusted computing device being in communication with a keyboard;

in response to receipt of the first command, entering, by the encryption device, an encryption mode of operation;

encrypting data from the keyboard by the encryption device, the encrypted data being provided to the remote application via an application of the untrusted computing device, a first pre-shared key being pre-provisioned in association with the encryption device, a plurality of indexed pre-shared keys including the first pre-shared key being pre-provisioned in association with the remote VM;

in response to receipt of a second command from the remote application, accessing, by the encryption device, a value that identifies the encryption device, the value being provided to the remote application via the application of the untrusted computing device, the encrypted data being decrypted at the remote VM using the first pre-shared key indexed by the value;

pre-provisioning the first pre-shared key in association with the encryption device, the plurality of indexed pre-shared keys being indexed by a plurality of values, respectively, the plurality of values including the value that identifies the encryption device; and in response to receipt at the application of the untrusted computing device of a query for the value from among the plurality of values, receiving, at the encryption device, the second command to provide the value.

16. The computer program product of claim 15 wherein the method further comprises:

in response to the application window of the untrusted computing device losing focus, receiving, at the encryption device, a third command from the remote application; and in response to receipt of the third command from the remote application, disengaging, by the encryption device, the encryption mode of operation.

* * * * *